A. H. GARRISON.
SAW CUTTING AND SETTING DEVICE.
APPLICATION FILED OCT. 7, 1918.

1,318,659.

Patented Oct. 14, 1919.
4 SHEETS—SHEET 1.

Inventor
Albert H. Garrison.
By Fred P. Gorin
Attorney.

A. H. GARRISON.
SAW CUTTING AND SETTING DEVICE.
APPLICATION FILED OCT. 7, 1918.

1,318,659.

Patented Oct. 14, 1919.
4 SHEETS—SHEET 3.

Inventor
Albert H. Garrison.
By
Fred P Fonn
Attorney.

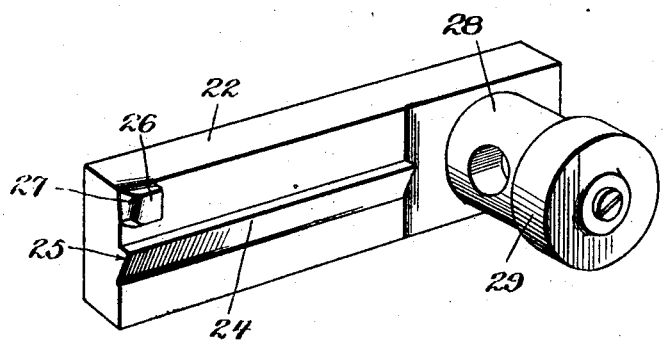
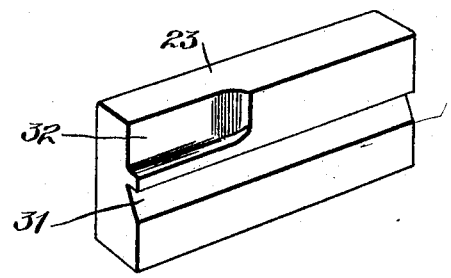
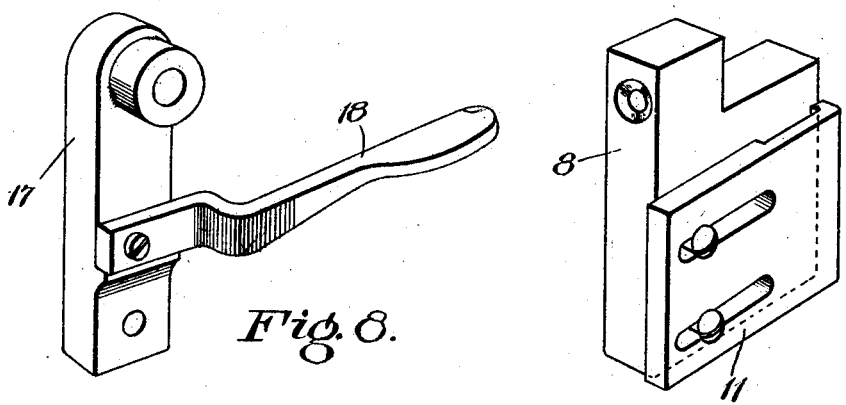

UNITED STATES PATENT OFFICE.

ALBERT H. GARRISON, OF KIRKLAND, WASHINGTON.

SAW CUTTING AND SETTING DEVICE.

1,318,659.      Specification of Letters Patent.     Patented Oct. 14, 1919.

Application filed October 7, 1918. Serial No. 257,233.

*To all whom it may concern:*

Be it known that I, ALBERT H. GARRISON, citizen of the United States, residing at Kirkland, in the county of King and State of Washington, have invented certain new and useful Improvements in Saw Cutting and Setting Devices, of which the following is a specification.

This invention relates to new and improved means for automatically cutting and setting saw teeth in a blank.

The invention is designed to provide a continuously operating machine which will cut teeth in a blank and set a previously cut tooth.

Another object of the invention is to provide a machine having reciprocating cutting and setting members which are interchangeable with other members having a different size or shape of cutting or setting members.

A further object of the invention is to provide a machine adapted for blanks of various sizes.

The invention also includes improvements in the construction and arrangement of parts which will be hereinafter described and particularly pointed out in the claims.

In the accompanying drawings:

Fig. 5 is a perspective view of one of the male dies.

Fig. 6 is a perspective view of one of the female dies.

Fig. 7 is a perspective view of the lower guide member.

Fig. 8 is a perspective view of the lever which carries one of the feed rollers.

Figure 1:
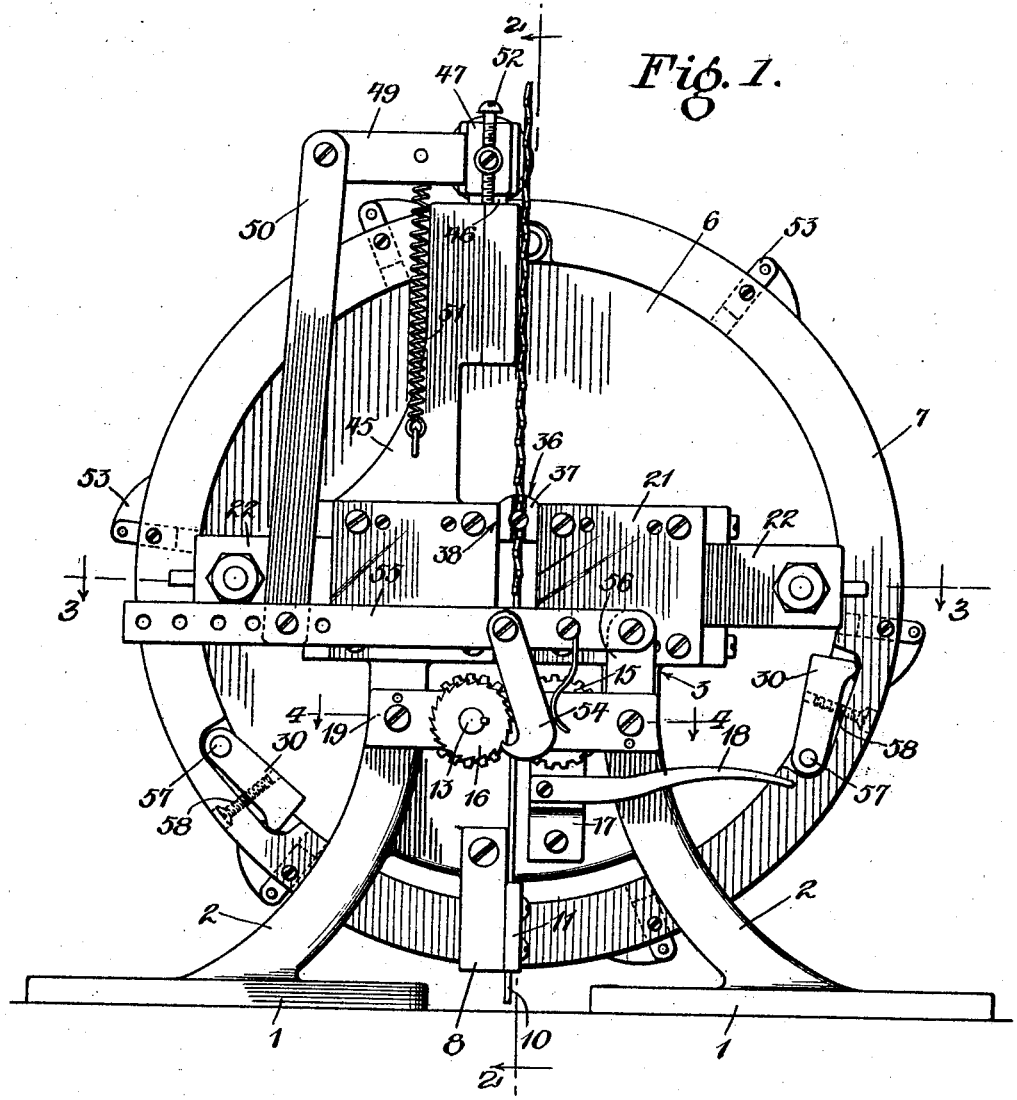
Figure 1 is a front elevation of the machine.
Figure 2:
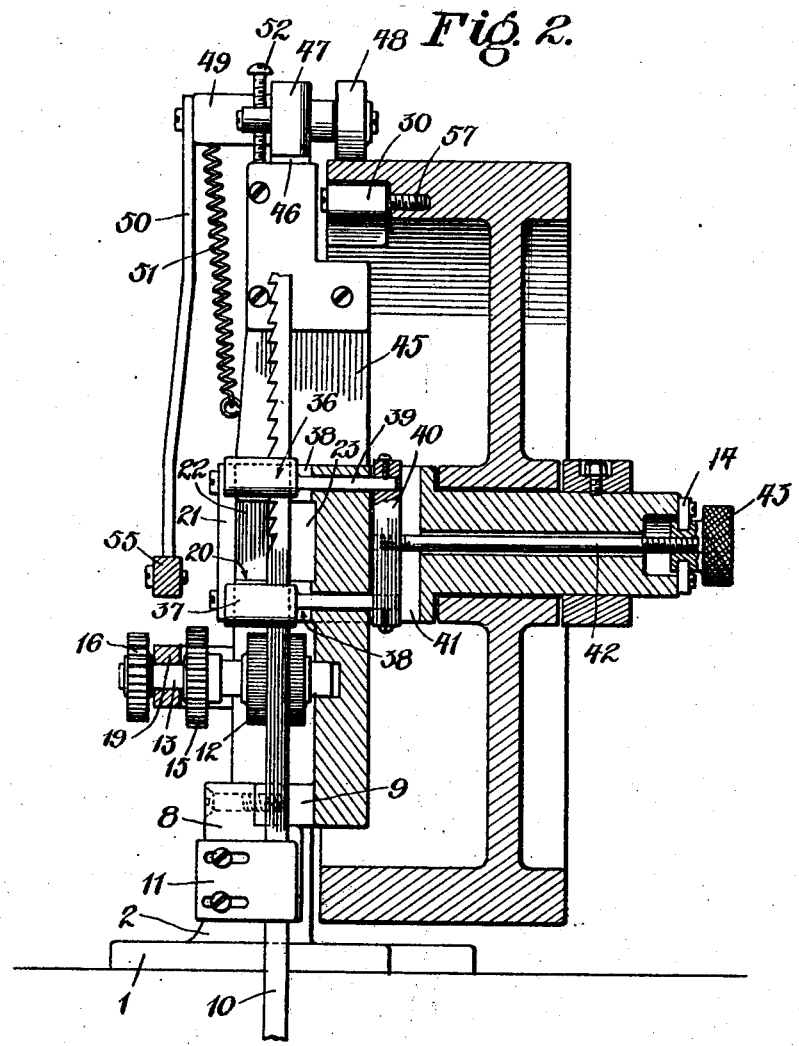
Fig. 2 is a section on the line 2—2 of Fig. 1.
Figures 3, 4:
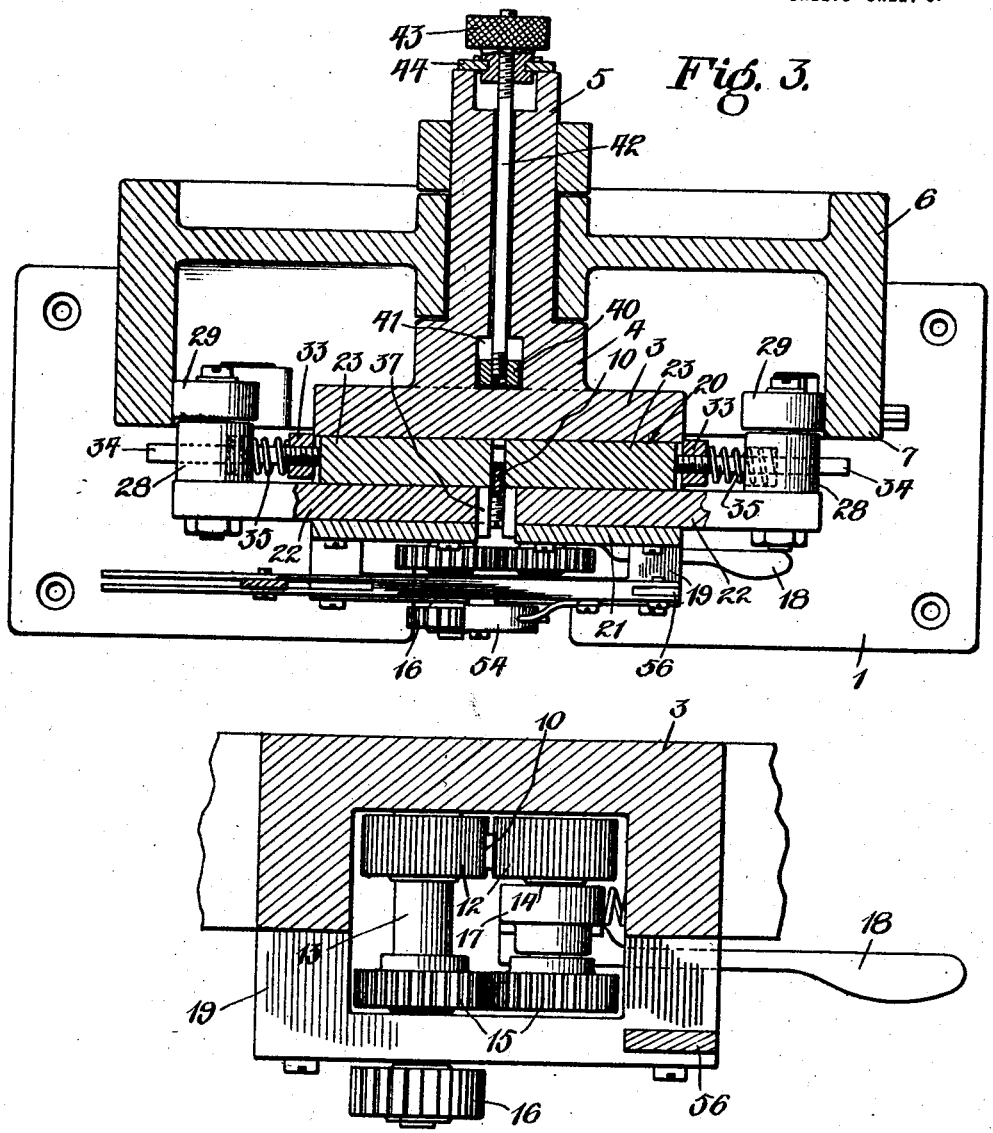
Fig. 3 is a section on the line 3—3 of Fig. 1.
Fig. 4 is a section on the line 4—4 of Fig. 1.

1 indicates a base flange from which extend legs 2, carrying a frame 3, to support the mechanism. A hub 4 extends laterally from the frame 3 and from the hub extends a horizontal shaft 5. A drive wheel 6 is mounted on the shaft 5 and has a flange 7, around which passes a belt (not shown).

A guide 8, is detachably mounted on a lug 9, cast on the lower portion of frame 3, and is adapted to receive a saw blank 10, entering the machine from the bottom. The guide 8 has an adjustable piece 11, for receiving blades of different size, and for changing the course of the blade into the machine.

A pair of knurled feed rollers 12 are mounted on shafts 13 and 14, with intermeshing gears 15, for gripping and feeding the saw blank 10, into the machine. The shaft 13, is rotatably mounted in frame 3 and carries a ratchet wheel 16, on one end; while shaft 14, is mounted in a lever 17, pivoted to frame 3, at its lower end and having an operating handle 18, adapted to disengage one of the knurled rollers 12, from the saw blank 10. A coil spring interposed between the frame and the lever 17, normally forces the knurled rollers 12, to firmly engage saw blank 10, when said blank is being fed through the machine. 19 is a detachable section of frame 3, which allows shafts 13 and 14, to be removed.

The upper portion of frame 3, is provided with a recess 20, forming a guide and housing for two pairs of dies, having cover plates 21, retaining the dies in position, and set screws are provided in the plates for adjusting the tension of the plates against the dies.

The dies which embody the cutting and setting members consist of two pairs, having male members 22, and female members 23, the pairs being positioned on either side of the saw blank 10, with their cutting edges adjacent the saw blank.

Each male die is provided with a rib 24 substantially the shape of a saw tooth in cross section with the cutting edge 25, at one end. A projection is formed at 26, a determined distance above the rib 24, with a beveled end 27, for setting the next to last tooth cut on the saw blank, while the cutting edge 25, cuts the next succeeding tooth. Each male die has a stud 28, secured near one end carrying a roller 29, actuated by cams 30, mounted on the inner face of flange 7, and giving the dies alternate reciprocating motion.

The female dies 23, each has a groove 31, for receiving the rib 24, and a groove 32, for receiving projection 26, on the male die.

Across either end of frame 3, is mounted a cross piece 33, in which is threaded a rod 34, for adjusting the longitudinal movement of the female dies and extending through a hole in stud 28 for guiding the stud and male die. Interposed between the cross piece 33, and the stud 28, is a coil spring 35, which normally forces the roller 29 into engagement with the inner face of flange 7.

Upper and lower guide members 36, having a bifurcated head portion 37 are mounted on either side of the dies in slots 38; stems 39, being integral with the head portions and slidably supported in frame 3. The free ends of the stems 39, are held by set screws in a squared rod 40, and mounted in a transverse slot 41, in the hub 4. A rod 42 is fastened to the square rod 40, between the ends; and mounted in the hollow shaft 5, the free end being threaded and carrying an adjusting screw 43. A halved ring, indicated at 44, is fastened to the end of shaft 5, the inner edge of which fits in an annular groove in adjusting screw 43 and holds it against longitudinal motion. The blank 10, passes through these guide members 36, and is firmly held therein by set screws in the free ends of the bifurcated heads.

It will be seen that by turning the adjusting screw 43, the guides 36 will be moved back or forth across the cutting edges 25 of the dies 22, thereby permitting the depth of the saw teeth cut to be changed.

In an extension 45, on the upper portion of frame 3, is mounted a shaft 46, having a head portion 47 and carrying a transverse shaft on which is mounted a roller 48. An arm 49, is secured to the head 47, having a link 50, pivoted at its outer end, and one end of spring 51, secured to the center portion, the other end of the spring being secured to the portion 45, on the frame. Spring 51 normally pulls on arm 49, forcing adjusting screw 52, to engage the upper end of portion 45, of the frame thereby keeping the roller 48 in position for engagement with feed cams 53, on the outer periphery of flange 7.

A spring pressed pawl 53, is mounted on the supporting arm 55, pivoted at one end to lug 56, on the detachable portion 19, of frame 3, and the other end having a slot and a series of holes for adjustably receiving the lower end of link 50.

There are twice as many feed cams 53, as there are cams 30, alternate cams 53, being mounted in the rear of cams 30, in the direction of rotation; and the intermediate cams 53 being interposed between the alternate cams.

The cams 30, are pivoted at 57, in a recess in the inner face of flange 7, and have an adjusting screw 58, extending through the flange and engaging the cam 30, near its free end. By the adjustment of screw 58, it will be seen that the distance the dies 22 are moved is readily changed.

The motion of pawl 54, which engages the ratchet 16, turning the knurled rollers 12, may be adjusted by changing the position of link 50 in arm 55, by adjusting the height of the feed cams 53 or turning adjusting screw 52, on the head 47.

These adjustments will permit of a very fine change in feed of saw blanks 10, which is highly desirable to properly proportion the length of the tooth with its other dimensions.

In operation, a saw blank 10, of any desired size is inserted from the bottom of the machine previously adjusted for the particular size blank through the guide 8, until it engages the knurled feed rollers 12. Motion is now imparted to drive wheel 6, which intermittently turns the feed rollers 12, through roller 48, actuated by cams 53, arm 49, link 50 and arm 55, supporting pawl 54 which engages ratchet 16, on shaft 13, with one of the knurled feed rollers 12.

The feed rollers 12, grip the saw blank 10, feeding it intermittently through the machine in such a manner that the cutting edges 25, of the reciprocating male dies 22, alternately engage the edge of the saw blank and cut the desired size teeth therin. In the next motion of each die 22 across the blank, the tooth just cut by that die is set by the projection 26. When a desired number of teeth are cut in blank 10, the drive wheel is stopped, handle 18, is depressed, disengaging the feed rollers 12, from the saw blank, and allowing same to be removed from the machine at the top.

If it is not desired to start cutting saw teeth at the end of the blank, it is obvious that depressing handle 18, will allow the blank to be inserted to the point desired for the first tooth.

Having thus described my invention, what I claim is:

1. In a device of the class described the combination of a frame work, reciprocating cutting dies slidably mounted within the said frame work, tooth setting dies integrally connected to the cutting dies, whereby one tooth may be cut from a saw blank while another already cut tooth is set in one operation, and means for reciprocating the said dies and for feeding the saw stock.

2. In a device of the class described the combination of a stationary base, combination tooth cutting and setting dies slidably mounted in said base, means for feeding a saw blade across the path of the said dies, whereby alternate teeth are cut and set by each of the said dies, and means for actuating alternately the said dies.

3. In a device of the class described the combination of a base casting, a pair of stationary dies mounted in line with the said base casting with the adjacent ends slightly separated, sliding dies mounted in the said base casting and coöperating with the said stationary dies, means for moving the movable dies alternately across the gap between the said stationary dies similar to the cutting and fitting elements on each coöperating pair of dies, whereby a saw stock which is moved through the gap between the dies will have alternate teeth cut and set by each pair of dies.

4. In a device of the class described the combination of a base casting, a pair of stationary dies mounted in line with the said base casting with their adjacent ends slightly separated, sliding dies mounted in the said base casting and coöperating with the said stationary dies, means for moving the movable dies alternately across the gap between the said stationary dies, similar cutting and setting elements on each coöperating pair of dies, whereby a saw stock which is moved through the gap between the dies will have alternate teeth cut and set by each pair of dies; the said die moving means including a removable wheel having an annular rim, cam lugs set around the inner periphery of the said rim, cam rollers secured to the extended outer ends of the said movable dies and coöperating with the said cam lugs, whereby as the wheel revolves the movable dies are alternately moved inwardly; saw feeding means which includes feed rollers, adjustable feeding cams uniformly spaced around the outer periphery of the said wheel, a cam roller coöperating with the said cams and connected to the said feed rolls, whereby the said rolls are advanced by the action of the cams.

In testimony whereof I affix my signature in the presence of two witnesses.

ALBERT H. GARRISON.

Witnesses:
 MARGUERITE LEYDA,
 FRED P. GORIN.

Copies of this patent may be obtained for five cents each, by addressing the "Commissioner of Patents, Washington, D. C."